(12) United States Patent
Boyle et al.

(10) Patent No.: US 9,034,975 B2
(45) Date of Patent: May 19, 2015

(54) COMPOSITE MATERIAL FOR STRUCTURAL APPLICATIONS

(71) Applicants: Hexcel Corporation, Dublin, CA (US); Hexcel Composites Limited, Dublin, CA (US)

(72) Inventors: Maureen Boyle, Castro Valley, CA (US); Dana Blair, Hardwick (GB); Yi-Jui Wu, San Leandro, CA (US); Yen-Seine Wang, San Ramon, CA (US); Bryce Floryancic, Concord, CA (US); Paul Mackenzie, Purley (GB)

(73) Assignees: Hexcel Corporation, Dublin, CA (US); Hexcel Composites Limited, Cambridge (GB)

( * ) Notice: Subject to any disclaimer, the term of this patent is extended or adjusted under 35 U.S.C. 154(b) by 171 days.

(21) Appl. No.: 13/904,306

(22) Filed: May 29, 2013

(65) Prior Publication Data

US 2013/0260022 A1 Oct. 3, 2013

Related U.S. Application Data

(62) Division of application No. 12/764,636, filed on Apr. 21, 2010, now Pat. No. 8,470,923.

(51) Int. Cl.
*C08G 69/26* (2006.01)
*B32B 38/08* (2006.01)
*C08G 59/18* (2006.01)
*C08G 59/40* (2006.01)
*C08G 59/50* (2006.01)
*C08J 5/24* (2006.01)
*C08L 63/00* (2006.01)

(52) U.S. Cl.
CPC .............. *B32B 38/08* (2013.01); *C08G 59/184* (2013.01); *C08G 59/4042* (2013.01); *C08G 59/5033* (2013.01); *C08J 5/24* (2013.01); *C08J 2363/00* (2013.01); *C08L 63/00* (2013.01); *C08L 2205/035* (2013.01)

(58) Field of Classification Search
USPC ........................... 524/538, 547, 590; 525/523
See application file for complete search history.

(56) References Cited

U.S. PATENT DOCUMENTS

| 5,652,278 | A | 7/1997 | Barker et al. |
| 5,985,431 | A | 11/1999 | Oosedo et al. |
| 6,045,898 | A | 4/2000 | Kishi et al. |
| 7,754,322 | B2 | 7/2010 | Tilbrook et al. |
| 7,968,179 | B2 | 6/2011 | Tilbrook et al. |
| 2008/0081170 | A1 | 4/2008 | Tilbrook et al. |
| 2010/0087582 | A1 | 4/2010 | Wang et al. |
| 2010/0087587 | A1 | 4/2010 | Wang et al. |

FOREIGN PATENT DOCUMENTS

| WO | 97/24398 | 7/1997 |
| WO | 2008/040963 | 4/2008 |
| WO | 2008/130484 | 10/2008 |
| WO | 2010/042369 | 4/2010 |

OTHER PUBLICATIONS

BPD-500 Product Specification, Kobo Products, Inc.—Nov. 2004.

*Primary Examiner* — Wenwen Cai
(74) *Attorney, Agent, or Firm* — W. Mark Bielawski; David J. Oldenkamp

(57) ABSTRACT

Composite material that contain epoxy resin which is toughened and strengthened with thermoplastic materials and a blend of insoluble particles. The uncured matrix resins include an epoxy resin component, a soluble thermoplastic component, a curing agent and an insoluble particulate component composed of elastic particles and rigid particles. The uncured resin matrix is combined with a fibrous reinforcement and cured/molded to form composite materials that may be used for structural applications, such as primary structures in aircraft.

20 Claims, 1 Drawing Sheet

COMPOSITE MATERIAL FOR STRUCTURAL APPLICATIONS

This application is a divisional of copending U.S. patent application Ser. No. 12/764,636, which was filed on Apr. 21, 2010.

BACKGROUND OF THE INVENTION

1. Field of the Invention

The present invention relates generally to pre-impregnated composite material (prepreg) that is used in making high performance composite parts. More particularly, the invention is directed to providing prepreg that may be cured/molded to form composite parts for use in structural applications where high strength, damage tolerance and interlaminar fracture toughness are required.

2. Description of Related Art

Composite materials are typically composed of a resin matrix and reinforcing fibers as the two primary constituents. The composite materials are often required to perform in demanding environments, such as in the field of aerospace where the physical limits and characteristics of composite parts are of critical importance.

Pre-impregnated composite material (prepreg) is used widely in the manufacture of composite parts. Prepreg is a combination of uncured resin and fiber reinforcement, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network have a large affect on the structural properties of the part. Prepreg is a preferred material for use in manufacturing load-bearing or structural parts and particularly aerospace structural parts, such as wings, fuselages, bulkheads and control surfaces. It is important that these parts have sufficient strength, damage tolerance, interlaminar fracture toughness and other requirements that are routinely established for such parts.

The fiber reinforcements that are commonly used in aerospace prepreg are multidirectional woven fabrics or unidirectional tape that contains fibers extending parallel to each other. The fibers are typically in the form of bundles of numerous individual fibers or filaments that are referred to as a "tows". The fibers or tows can also be chopped and randomly oriented in the resin to form a non-woven mat. These various fiber reinforcement configurations are impregnated with a carefully controlled amount of uncured resin. The resulting prepreg is typically placed between protective layers and rolled up for storage or transport to the manufacturing facility.

Prepreg may also be in the form of short segments of chopped unidirectional tape that are randomly oriented to form a non-woven mat of chopped unidirectional tape. This type of pre-preg is referred to as a "quasi-isotropic chopped" prepreg. Quasi-isotropic chopped prepreg is similar to the more traditional non-woven fiber mat prepreg, except that short lengths of chopped unidirectional tape (chips) are randomly oriented in the mat rather than chopped fibers.

The tensile strength of a cured composite material is largely dictated by the individual properties of the reinforcing fiber and matrix resin, as well as the interaction between these two components. In addition, the fiber-resin volume ratio is an important factor. Cured composites that are under tension tend to fail through a mechanism of accumulated damage arising from multiple tensile breakages of the individual fiber filaments located in the reinforcement tows. Once the stress levels in the resin adjacent to the broken filament ends becomes too great, the whole composite can fail. Therefore, fiber strength, the strength of the matrix, and the efficiency of stress dissipation in the vicinity of broken filament ends will contribute to the tensile strength of a cured composite material.

In many applications, it is desirable to maximize the tensile strength property of the cured composite material. However, attempts to maximize tensile strength can often result in negative effects on other desirable properties, such as the compression performance and damage tolerance of the composite structure. In addition, attempts to maximize tensile strength can have unpredictable effects on the tack and out-life of the prepreg. The stickiness or tackiness of the uncured prepreg is commonly referred to as "tack". The tack of uncured prepreg is an important consideration during lay up and molding operations. Prepreg with little or no tack is difficult to form into laminates that can be molded to form composite parts. Conversely, prepreg with too much tack can be difficult to handle and also difficult to place into the mold. It is desirable that the prepreg have the right amount of tack to insure easy handling and good laminate/molding characteristics. In any attempt to increase strength and/or damage tolerance of a given cured composite material, it is important that the tack of the uncured prepreg remain within acceptable limits to insure suitable prepreg handling and molding.

The "out-life" of prepreg is the length of time that the prepreg may be exposed to ambient conditions before undergoing an unacceptable degree of curing. The out-life of prepreg can vary widely depending upon a variety of factors, but is principally controlled by the resin formulation being used. The prepreg out-life must be sufficiently long to allow normal handling, lay up and molding operations to be accomplished without the prepreg undergoing unacceptable levels of curing. In any attempt to increase strength and/or damage tolerance of a given cured composite material, it is important that the out-life of the uncured prepreg remain as long as possible to allow sufficient time to process, handle and lay up the prepreg prior to curing.

The most common method of increasing composite tensile performance is to change the surface of the fiber in order to weaken the strength of the bond between matrix and fiber. This can be achieved by reducing the amount of electro-oxidative surface treatment of the fiber after graphitization. Reducing the matrix fiber bond strength introduces a mechanism for stress dissipation at the exposed filament ends by interfacial de-bonding. This interfacial de-bonding provides an increase in the amount of tensile damage a composite part can withstand before failing in tension.

Alternatively, applying a coating or "size" to the fiber can lower the resin-fiber bond strength. This approach is well known in glass fiber composites, but can also be applied to composites reinforced with carbon fibers. Using these strategies, it is possible to achieve significant increases in tensile strength. However, the improvements are accompanied by a decrease in properties, such as compression after impact (CAI) strength, which requires high bond strength between the resin matrix and fibers.

Another alternative approach is to use a lower modulus matrix resin. Having a low modulus resin reduces the level of stress that builds up in the immediate vicinity of broken filaments. This is usually achieved by either selecting resins with an intrinsically lower modulus (e.g. cyanate esters), or by incorporating an ingredient such as an elastomer (carboxy-terminated butadiene-acrylonitrile [CTBN], amine-terminated butadiene-acrylonitrile [ATBN] and the like). Combinations of these various approaches are also known.

Selecting lower modulus resins can increase composite tensile strength. The lower modulus resin tends to have increased damage tolerance, which is typically measured by an increase in compression after impact (CAI) strength. However, the improvement in CAI can result in a decrease in open hole compression strength (OHC). Accordingly, it is very difficult to achieve a simultaneous increase in both open hole compression and damage tolerance.

Multiple layers of prepreg are commonly used to form composite parts for structural applications that have a laminated structure. Delamination of such composite parts is an important failure mode. Delamination occurs when two layers debond from each other. Important design limiting factors include both the energy needed to initiate a delamination and the energy needed to propagate it. The initiation and growth of a delamination is often determined by examining Mode I and Mode II fracture toughness. Fracture toughness is usually measured using composite materials that have a unidirectional fiber orientation. The interlaminar fracture toughness of a composite material is quantified using the G1c (Double Cantilever Beam) and G2c (End Notch Flex) tests. In Mode I, the pre-cracked laminate failure is governed by peel forces and in Mode II the crack is propagated by shear forces. The G2c interlaminar fracture toughness is related to CAI. Prepreg materials that exhibit high damage tolerances also tend have high CAI and G2c values.

A simple way to increase interlaminar fracture toughness has been to increase the ductility of the matrix resin by introducing thermoplastic sheets as interleaves between layers of prepreg. However, this approach tends to yield stiff, tack-free materials that are difficult to use. Another approach has been to include a tough resin interlayer of about 25 to 30 microns thickness between fiber layers. The prepreg product includes a resin rich surface containing fine, tough thermoplastic particles. For the interlayer-toughened material, even though the initial values of Mode II fracture toughness are about four times as high as that of carbon fiber prepreg without interlayer, the fracture toughness value decreases as the crack propagates and converges at a low value, which is almost the same as that of the non-interleaved system. Ultimately, the average G2c values hit a ceiling as the crack moves from the very tough interlaminar (resin-rich) region of the composite to the less tough intralaminar (fiber) zone.

Although many existing prepregs are well suited for their intended use in providing composite parts that are strong and damage tolerant, there still is a continuing need to provide prepreg that may be used to make composite parts for structural applications that have high levels of strength (e.g. compression strength) and which have both high damage tolerance (CAI) and interlaminar fracture toughness (G1c and G2c).

SUMMARY OF THE INVENTION

In accordance with the present invention, pre-impregnated composite material (prepreg) is provided that can be molded to form composite parts that have high levels of strength (OHC), damage tolerance (CAI) and interlaminar fracture toughness (G1c, G2c). This is achieved without causing any substantial negative impact upon the physical or chemical characteristics of the uncured prepreg or the cured composite part.

The pre-impregnated composite materials of the present invention are composed of reinforcing fibers and an uncured resin matrix. The uncured resin matrix includes an epoxy resin component made up of one or more difunctional and/or multifunctional epoxy resins. The resin matrix further includes a soluble thermoplastic component and a curing agent. As a feature of the present invention, the resin matrix additionally includes a blend of insoluble particles that includes both elastic particles and rigid particles. It was discovered that a blend of both rigid and elastic insoluble particles provides prepreg that can be molded to form composite parts that have relatively high compressive strength (OHC), damage tolerance (CAI) and interlaminar toughness (G1c and G2c).

The benefits of high compressive strength, damage tolerance and interlaminar toughness provided by the present invention are obtained without substantially affecting the other desirable physical properties of the prepreg (e.g. tack and out-life) or the resultant cured composite material (e.g. matrix-fiber bonding, strength, stress dissipation, compression performance, and the like). Accordingly, composite parts and structures made using the uncured composite material of the present invention are particularly well-suited for structural applications, such as primary structures in aircraft The above described and many other features and attendant advantages of the present invention will become better understood by reference to the following detailed description when taken in conjunction with the accompanying drawings.

DETAILED DESCRIPTION OF THE INVENTION

Uncured matrix resin compositions in accordance with the present invention may be used in a wide variety of situations where a thermoplastic-toughened epoxy resin is desired. Although the uncured epoxy resin compositions may be used alone, the compositions are generally combined with a fibrous support to form composite materials. The composite materials may be in the form of a prepreg, partially cured prepreg or a completely cured final part. The term "uncured", when used herein in connection with prepreg, matrix resin or composite material, is intended to covers items that may have been subjected to some curing, but which have not been completely cured to form the final composite part or structure.

Although the composite materials may be used for any intended purpose, they are preferably used in aerospace vehicles and particularly preferred for use in commercial and military aircraft. For example, the composite materials may be used to make non-primary (secondary) aircraft structures. However the preferred use of the composite material is for structural applications, such as primary aircraft structures. Primary aircraft structures or parts are those elements of either fixed-wing or rotary wing aircraft that undergo significant stress during flight and which are essential for the aircraft to maintain controlled flight. The composite materials may also be used for other structural applications to make load-bearing parts and structures in general.

Figure 1:
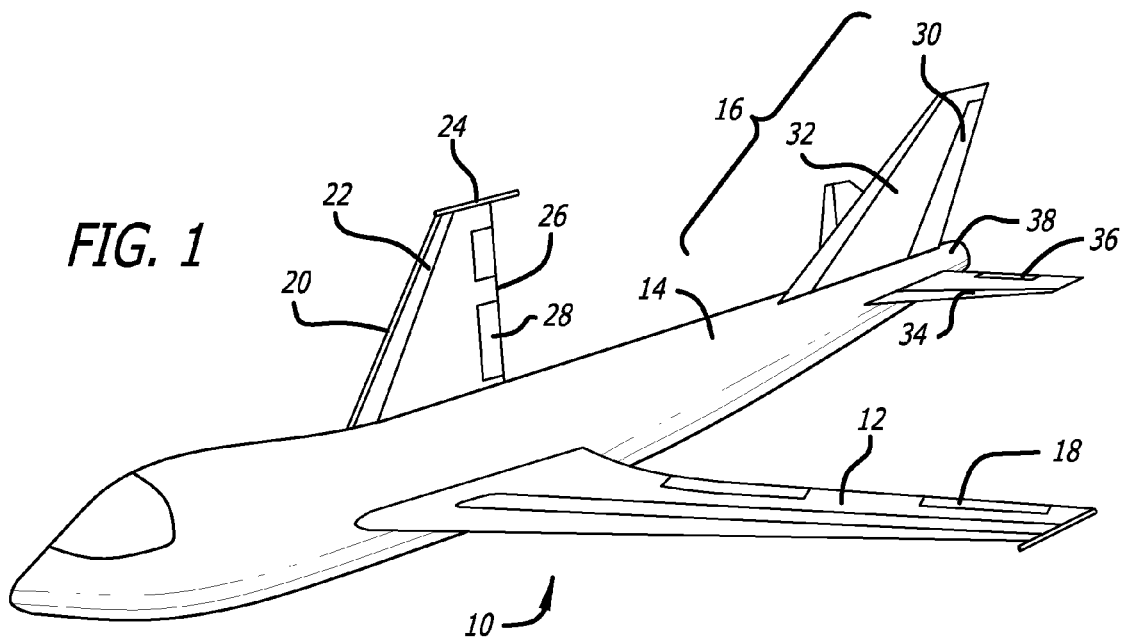
FIG. 1 is a perspective view of an aircraft, which depicts exemplary primary aircraft structures that can be made using composite materials in accordance with the present invention.
Figure 2:
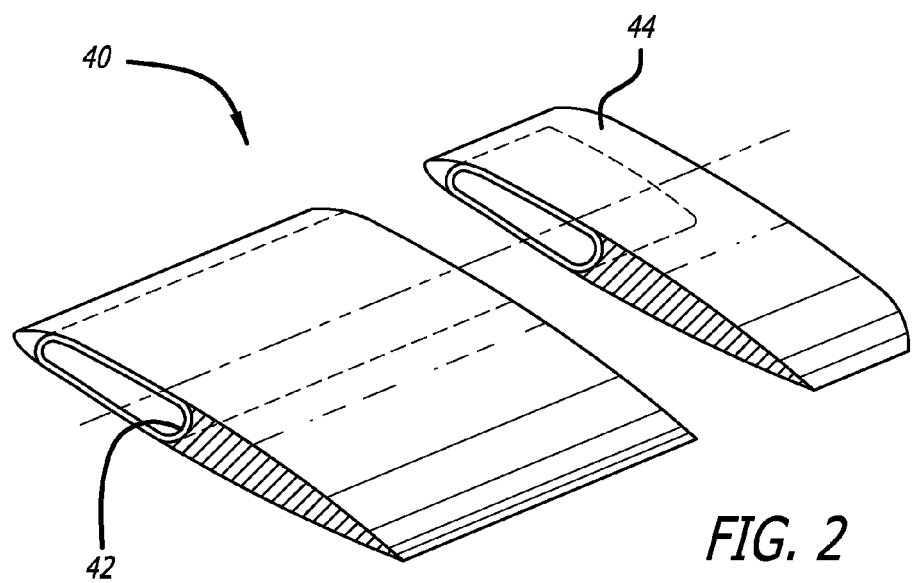
FIG. 2 is a partial view of a helicopter rotor blade, which depicts exemplary primary aircraft structures that can be made using composite materials in accordance with the present invention.

FIG. 1 depicts a fixed-wing aircraft at 10 that includes a number of exemplary primary aircraft structures and parts that may be made using composite materials in accordance with the present invention. The exemplary primary parts or structures include the wing 12, fuselage 14 and tail assembly 16. The wing 12 includes a number of exemplary primary aircraft parts, such as ailerons 18, leading edge 20, wing slats 22, spoilers 24 trailing edge 26 and trailing edge flaps 28. The tail assembly 16 also includes a number of exemplary primary parts, such as rudder 30, fin 32, horizontal stabilizer 34, elevators 36 and tail 38. FIG. 2 depicts the outer end portions of a helicopter rotor blade 40 which includes a spar 42 and outer surface 44 as primary aircraft structures. Other exemplary primary aircraft structures include wing spars, and a variety of flanges, clips and connectors that connect primary parts together to form primary structures.

The pre-impregnated composite materials (prepreg) of the present invention may be used as a replacement for existing prepreg that is being used to form composite parts in the aerospace industry and in any other structural applications Where high strength and damage tolerance is required. The invention involves substituting the resin formulations of the present invention in place of existing resins that are being used to make prepreg. Accordingly, the resin formulations of the present invention are suitable for use in any of the conventional prepreg manufacturing and curing processes that are suitable for thermoplastic-toughened epoxy resins.

The pre-impregnated composite materials of the present invention are composed of reinforcing fibers and an uncured resin matrix. The reinforcing fibers can be any of the conventional fiber configurations that are used in the prepreg industry. The matrix includes an epoxy resin component that may include difunctional epoxy resins, but preferably includes a combination of trifunctional and tetra functional aromatic epoxy resins. The resin matrix further includes a soluble thermoplastic component, an insoluble particulate component and a curing agent. As will be discussed in detail below, a feature of the present invention is that the particulate component includes a combination of elastic particles and rigid particles. It was discovered that composite materials that contain a blend of insoluble elastic particles and insoluble rigid particles have unexpectedly high strength (OHC), damage tolerance (CAI) and interlaminar toughness (G1c, G2c), all of which are required for structural applications.

The epoxy resin component may include a difunctional epoxy resin. Any suitable difunctional epoxy resin may be used. It will be understood that this includes any suitable epoxy resin having two epoxy functional groups. The difunctional epoxy resin may be saturated, unsaturated, cylcoaliphatic, alicyclic or heterocyclic.

Exemplary difunctional epoxy resins include those based on: diglycidyl ether of Bisphenol F, Bisphenol A (optionally brominated), glycidyl ethers of phenol-aldehyde adducts, glycidyl ethers of aliphatic diols, diglycidyl ether, diethylene glycol diglycidyl ether, Epikote, Epon, aromatic epoxy resins, epoxidised olefins, brominated resins, aromatic glycidyl amines, heterocyclic glycidyl imidines and amides, glycidyl ethers, fluorinated epoxy resins, or any combination thereof. The difunctional epoxy resin is preferably selected from diglycidyl ether of Bisphenol F, diglycidyl ether of Bisphenol A, diglycidyl dihydroxy naphthalene, or any combination thereof. Most preferred is diglycidyl ether of Bisphenol F. Diglycidyl ether of Bisphenol F is available commercially from Huntsman Advanced Materials (Brewster, N.Y.) under the trade names Araldite GY281 and GY285. A difunctional epoxy resin may be used alone or in any suitable combination with other difunctional epoxies.

Although difunctional epoxy resin may be used, it is preferred that the epoxy resin component be composed of a combination of multifunctional epoxy resins and particularly a combination of trifunctional and tetrafunctional epoxy resins. The multifunctional epoxy resins may be saturated, unsaturated, cylcoaliphatic, alicyclic or heterocyclic. Suitable multifunctional epoxy resins, by way of example, include those based upon: phenol and cresol epoxy novolacs, glycidyl ethers of phenol-aldehyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidised olefins; brominated resins; aromatic glycidyl amines; heterocyclic glycidyl imidines and amides; glycidyl ethers; fluorinated epoxy resins or any combination thereof. The epoxy resin component should make up from 40 to 65 weight percent of the matrix.

A trifunctional epoxy resin will be understood as having the three epoxy groups substituted either directly or indirectly in a para or meta orientation on the phenyl ring in the backbone of the compound. The meta orientation is preferred. A tetrafunctional epoxy resin will be understood as having the four epoxy groups substituted either directly or indirectly in a meta or para orientation on the phenyl ring in the backbone of the compound.

The phenyl ring may additionally be substituted with other suitable non-epoxy substituent groups. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group. Suitable tetrafunctional epoxy resins include N,N,N',N'-tetraglycidyl-m-xylenediamine (available commercially from Mitsubishi Gas Chemical Company (Chiyoda-Ku, Tokyo, Japan) under the name Tetrad-X), and Erisys GA-240 (from CVC Chemicals, Morrestown, N.J.). Suitable trifunctional epoxy resins, by way of example, include those based upon: phenol and cresol epoxy novolacs; glycidyl ethers of phenol-aldehyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof.

A preferred trifunctional epoxy resin is triglycidyl meta-aminophenol. Triglycidyl meta-aminophenol is available commercially from Huntsman Advanced Materials (Monthey, Switzerland) under the trade names Araldite MY0600 or MY0610 and from Sumitomo Chemical Co. (Osaka, Japan) under the trade name ELM-120.

Additional examples of suitable multifunctional epoxy resin include, by way of example, N,N,N',N'-tetraglycidyl-4, 4'-diaminodiphenyl methane (TGDDM available commercially as Araldite MY720 and MY721 from Huntsman Advanced Materials (Monthey, Switzerland), or ELM 434 from Sumitomo), triglycidyl ether of para aminophenol (available commercially as Araldite MY 0500 or MY 0510 from Huntsman Advanced Materials), dicyclopentadiene based epoxy resins such as Tactix 556 (available commercially from Huntsman Advanced Materials), tris-(hydroxyl phenyl), and methane-based epoxy resin such as Tactix 742 (available commercially from Huntsman Advanced Materials). Other suitable multifunctional epoxy resins include DEN 438 (from Dow Chemicals, Midland, Mich.), DEN 439 (from Dow Chemicals), Araldite ECN 1273 (from Huntsman Advanced Materials), and Araldite ECN 1299 (from Huntsman Advanced Materials). TGDDM (MY720 or MY721) is a preferred tetrafunctional epoxy.

It is preferred that the resin matrix include from 25 to 40 weight percent of trifunctional epoxy resin and 10 to 20 weight percent tetrafunctional epoxy resin. More preferred is a resin matrix that contains from 30 to 35 weight percent of trifunctional epoxy resin and 13 to 17 weight percent tetrafunctional epoxy resin. A combination of triglycidyl meta-aminophenol (MY0600 or MY0610) with TGDDM (MY720 or MY721) is preferred.

The uncured resin matrix of the present invention also includes a thermoplastic component that is soluble in the epoxy resin. Any suitable soluble thermoplastic polymer that has been used as toughening agent may be used. Typically, the thermoplastic polymer is added to the resin mix as particles that are dissolved in the resin mixture by heating prior to addition of the insoluble particles and curing agent. Once the thermoplastic agent is substantially dissolved in the hot matrix resin precursor (i.e. the blend of epoxy resins), the precursor is cooled and the remaining ingredients (curing agent and insoluble particles) are added.

Exemplary thermoplastics that can be used as the soluble thermoplastic component include any of the following thermoplastics which must be soluble in the epoxy component: polyethersulfone, polyetherimide and polysulphone.

Polyethersulfone (PES) is preferred for use as the soluble thermoplastic component. PES is sold under the trade name Sumikaexcel 5003P, which is commercially available from Sumitomo Chemicals. Alternatives to 5003P are Solvay polyethersulphone 105RP, or the non-hydroxyl terminated grades such as Solvay 1054P. It is preferred that the uncured resin matrix include from 10 to 20 weight percent of the thermoplastic component. More preferred are uncured resin matrix that contain from 12 to 18 weight percent soluble thermoplastic component. Most preferred are resin matrix that contain from 13 to 15 weight percent soluble thermoplastic component.

In accordance with the present invention, the uncured resin matrix includes an insoluble particle component that is composed of a combination of elastic particles and rigid particles. These particles do not dissolve during the curing process and remain within the interlayer zone of the cured composite material. The amount of insoluble particles in the uncured resin matrix is preferably from 10 to 30 weight percent. More preferred are resin matrices that contain from 15 to 25 weight percent insoluble particles. Most preferred are resin matrices that contain form 18 to 22 weight percent insoluble particles.

In order to provide relatively high values for OHC, CAI, G1c and G2c, the weight ratio of elastic particles to rigid particles should be from about 1:1.3 to 1:2.5. More preferred are weight ratios of elastic particles to rigid particles of between 1:1.3 and 1:2.1. Most preferred is a weight ratio of elastic particles to rigid particles of about 1:1.9, which produces a peak in the values for OHC, CAI, G1c and G2c.

Examples of suitable rigid particles include polyamideimide (PAI) and polyamide (PA). Rigid particles have glass transition temperatures ($T_g$) that are above room temperature (22° C.). Rigid particles are harder than the elastic particles. In addition, rigid particles are not as easily deformed as the elastic particles. Rigid particles have a Young's modulus of between 100 and 1000 ksi. Preferably, the Young's modulus of the rigid particles is between 200 and 800 ksi.

Polyamide particles come in a variety of grades that have different melting temperatures depending upon the particular polyamide and the molecular weight of the polyamide. Polyamide particles in accordance with the present invention have melting points of above 190° C. and below 240° C. This is well above typical epoxy prepreg curing temperatures. So that little, if any, dissolution of the particles occurs during cure. It is preferred that the polyamide particles have a Young's modulus of between 200 and 400 ksi with a modulus of about 300 ksi being particularly preferred.

Suitable polyamide particles contain polyamide 6 (caprolactame—PA6) as the main ingredient, but may also contain minor amounts of polyamide 12 (laurolactame—PA12), polyamide 11, provided that the melting temperature of the particle remains above the cure temperature of the resin matrix. The particles should have particle sizes of below 100 microns. It is preferred that the particles range in size from 5 to 60 microns and more preferably from 10 to 30 microns. It is preferred that the average particle size be around 20 microns. The particles should be substantially spherical. The particles can be made by anionic polymerization in accordance with PCT application WO2006/051222, by co-extrusion, precipitation polymerization, emulsion polymerization or by cryogenic grinding. Suitable polyamide particles that may be used as rigid particles in accordance with the present invention are available commercially from Arkema of France under the trade name Orgasol.

Orgasol 1002 D NAT1 is an example of a preferred polyamide particle. Orgasol 1002 D NAT1 is composed of 100% PA6. The Young's modulus of Orgasol 1002 D NAT1 particles is about 300 ksi. The particles (as supplied) have a degree of crystallinity equal to 51%, a glass transition temperature (Tg) of 26° C., a density of 1.15 (ISO 1183), a molecular weight of 60,200 (g/mole) with a melting point of 217° C. and an average particle size of 20 microns. Another example of a suitable rigid particle is Orgasol 3202 D Nat 1 which contains PA6/PA12 copolymer particles (80% PA6 and 20% PA12). The particles (as supplied) have a degree of crystallinity equal to 43%, a Tg of 29° C. a density of 1.09 (ISO 1183), a molecular weight of 60,800 (g/mole) and a solution viscosity of 1.01. The polyamide copolymer particles in Orgasol 3202 D Nat 1 have an average particle size of 20 microns and a melting point of 194° C. The amount of PA12 in the copolymer may be increased above 20%, if desired, provided that the melting point of the particles does not drop below the cure temperature for the matrix and preferably is at least 10° C. above the cure temperature.

It is preferred that the resin matrix include PA particles and that the amount of PA particles be in the range of 1 to 5 weight percent of the total resin matrix. More preferred are PA particle amounts in the range of 2-4 weight percent.

Suitable PAI particles are available commercially as TORLON 4000T or TORLON 4000TF from Solvay Advanced Polymers (Alpharetta, Ga.). The preferred average particle size range for the PAI particles is from 8 microns to 20 microns. PAI particles have a Young's modulus of about 600 ksi. It is preferred that the resin matrix include PAI particles and that the amount of PAI particles be in the range of 5 to 12 weight percent of the total resin matrix. More preferred are PAI particle amounts in the range of 6-12 weight percent.

Examples of suitable elastic particles include particles that are composed principally of polyurethane. The particles should contain at least 95 weight percent polyurethane polymer. Other elastic particles that are composed of a high molecular weight elastomer that is insoluble in epoxy may also be used. The Young's modulus of elastic particles should be below 10 ksi. The $T_g$ of elastic particles should be at room temperature (22° C.) or below.

Polyurethane particles that contain a small amount (less than 5 weight percent) of silica are a preferred type of elastic particle. Polyurethane particles that are available from Aston Chemicals (Aylesbury, UK) under the trade name SUNPU-170 are a preferred type of polyurethane particle. SUNPU-170 is composed of HDI/Trimethylol Hexyllactone Crosspolymer, Silica. The particles contain about 95 to 99 weight percent urethane polymer and 1 to 5 weight percent silica. The particles are microspheres that range in diameter from 5 microns to 20 micron. Suitable polyurethane particles are also available from Kobo Products (South Plainfield, N.J.) under the trade name BPD-500, BP-500T and BP-500W. These particles are also composed of HDI/Trimethylol hexyllactone Crosspolymer and silica. The particles are also microspheres that range in size from 10 microns to 15 microns. The BPD-500 microspheres contain from 1 to 3 weight percent silica and from 97 to 99 weight percent polyurethane.

The K value of a particle is a measure of the elasticity of the particle and indicates the force required to achieve specific levels of deformation. K value=$(3/2^{1/2})(F)(S^{-3/2})(R^{-1/2})$ where S is the sample displacement and R is the sample radius. An exemplary machine that is used to determine K values is the Shimadzu Micro Compression Testing Machine (MCTM-500). The K value at 10% deformation for elastic particles in accordance with the present invention should be below 25. Preferably, the elastic particles will have a K value at 10% deformation that is below 10. Most preferred are elastic particles, such as SUNPU-170 and other polyurethane particles, which have K values at 10% deformation of 5 and below. The K value of SUNPU-170 at 10% deformation is about 2.4.

The K value of rigid particles in accordance with the present invention at 10% deformation should be above 50. For example, polyamide particles typically have K values at 10% deformation that are above 80. Preferred polyamide particles will have a K value at 10% deformation of between 90 and 110. Polyamideimide particles have K values that are higher than polyamide particles.

The particle sizes and relative amounts of the rigid and elastic particles are selected so that not only are the desired levels of OHC, CAI, G1c and G2c achieved, but also so that the viscosity of the epoxy resin composition is within a range that is suitable for prepreg preparation. It is preferred that the viscosity of the resin be the same as the viscosity of existing high performance toughened resins that are presently used in the aerospace industry to make prepreg including quasi-isotropic chopped prepreg. In order to achieve the desired combination of uncured resin properties and cured composite properties in accordance with the present invention, it is preferred that the rigid particle portion of the insoluble particulate component contain at least two different types of rigid particles in the amounts described herein.

A preferred combination of rigid particles includes PAI and PA. The preferred weight ratios of PAI to PA ranges from 2:1 to 4:1 with weight ratios of between about 2:1 and 3.8:1 being particularly preferred. It is preferred that the combination of PAI and PA rigid particles be used with polyurethane elastic particles. It is also preferred that the weight ratio of polyurethane particles to PA particles should be from about 3.0:1 to 1.5:1. More preferred are weight ratios of polyurethane particles to PA particles of between 2.0:1 and 2.5:1. Most preferred is a weight ratio of polyurethane particles to PA particles of about 2.3:1. These preferred ratios of polyurethane particles to PA particles are particularly desirable when the amount of PAI is between 6 and 12 weight percent of the total resin matrix.

The uncured resin matrix includes at least one curing agent. Suitable curing agents are those which facilitate the curing of the epoxy-functional compounds of the invention and, particularly, facilitate the ring opening polymerization of such epoxy compounds. In a particularly preferred embodiment, such curing agents include those compounds which polymerize with the epoxy-functional compound or compounds, in the ring opening polymerization thereof. Two or more such curing agents may be used in combination.

Suitable curing agents include anhydrides, particularly polycarboxylic anhydrides, such as nadic anhydride (NA), methylnadic anhydride (MNA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methylhexahydrophthalic anhydride (MHHPA—available from Anhydrides and Chemicals Inc.), endomethylenetetrahydrophthalic anhydride, hexachloroendomethylene-tetrahydrophthalic anhydride (Chlorentic Anhydride—available from Velsicol Chemical Corporation, Rosemont, Ill.), trimellitic anhydride, pyromellitic dianhydride, maleic anhydride (MA—available from Aldrich), succinic anhydride (SA), nonenylsuccinic anhydride, dodecenylsuccinic anhydride (DDSA—available from Anhydrides and Chemicals Inc.), polysebacic polyanhydride, and polyazelaic polyanhydride.

Further suitable curing agents are the amities, including aromatic amines, e.g., 1,3-diaminobenzene, 1,4-diaminobenzene, 4,4'-diamino-diphenylmethane, and the polyaminosulphones, such as 4,4'-diaminodiphenyl sulphone (4,4'-DDS—available from Huntsman), 4-aminophenyl sulphone, and 3,3'-diaminodiphenyl sulphone (3,3'-DDS).

Suitable curing agents may also include polyols, such as ethylene glycol (EG—available from Aldrich), poly(propylene glycol), and poly(vinyl alcohol); and the phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398, which is commercially available as CG-125 from Ajinomoto USA Inc. (Teaneck, N.J.), is also suitable.

Different commercially available compositions may be used as curing agents in the present invention. One such composition is AH-154, a dicyandiamide type formulation, available from Ajinomoto USA Inc. Others which are suitable include Ancamide 400, which is a mixture of polyamide, diethyltriamine, and triethylenetetraamine, Ancamide 506, which is a mixture of amidoamine, imidazoline, and tetraethylenepentaamine, and Ancamide 1284, which is a mixture of 4,4'-methylenedianiline and 1,3-benzenediamine; these formulations are available from Pacific Anchor Chemical, Performance Chemical Division, Air Products and Chemicals, Inc., Allentown, Pa.

Additional suitable curing agents include imidazole (1,3-diaza-2,4-cyclopentadiene) available from Sigma Aldrich (St. Louis, Mo.), 2-ethyl-4-methylimidazole available from Sigma Aldrich, and boron trifluoride amine complexes, such as Anchor 1170, available from Air Products & Chemicals, Inc.

Still additional suitable curing agents include 3,9-bis(3-aminopropyl-2,4,8,10-tetroxaspiro[5.5]undecane, which is commercially available as ATU, from Ajinomoto USA Inc., as well as aliphatic dihydrazide, which is commercially available as Ajicure UDH, also from Ajinomoto USA Inc., and mercapto-terminated polysulphide, which is commercially available as LP540, from Morton International, Inc., Chicago, Ill.

The curing agent(s) are selected such that they provide curing of the resin component of the composite material when combined therewith at suitable temperatures. The amount of curing agent required to provide adequate curing of the resin component will vary depending upon a number of factors including the type of resin being cured, the desired curing temperature and curing time. Curing agents typically include cyanoguanidine, aromatic and aliphatic amines, acid anhydrides, Lewis Acids, substitutedureas, imidazoles and hydrazines. The particular amount of curing agent required for each particular situation may be determined by well-established routine experimentation.

Exemplary preferred curing agents include 4,4'-diaminodiphenyl sulphone (4,4'-DDS) and 3,3'-diaminodiphenyl sulphone (3,3'-DDS), both commercially available from Huntsman. The curing agent should be present in an amount that ranges from 10 to 30 weight percent of the uncured resin matrix. Preferably, the amount of curing agent will be between 15 and 25 weight percent of the uncured resin matrix.

3,3'-DDS is a preferred curing agent. It is preferably used as the sole curing agent in amounts ranging from 16 to 25 weight percent. The use of substantial amounts of the less reactive 4,4'-DDS as the curing agent is not preferred. Use of the more reactive 3,3'-DDS to cure resin matrix formulations of the present invention provides increased strength in the cured composite materials without reducing damage tolerance and interlaminar toughness. In addition, properties of the prepreg, such as tack and prepreg outlife, are not unduly affected.

The uncured matrix resin may also include additional ingredients, such as performance enhancing or modifying agents and additional thermoplastic polymers provided they do not adversely affect the tack and outlife of the prepreg or the strength and damage tolerance of the cured composite part. The performance enhancing or modifying agents, for example, may be selected from flexibilizers, toughening agents/particles, accelerators, core shell rubbers, flame retardants, wetting agents, pigments/dyes, UV absorbers, antifungal compounds, fillers, conducting particles, and viscosity modifiers. Suitable additional thermoplastic polymers for use as additional toughening agents include any of the following, either alone or in combination: polyether sulphone (PES), polyether ethersulphone (PEES), polyphenyl sulphone, polysulphone, polyimide, polyetherimide, aramid, polyamide, polyester, polyketone, polyetheretherketone (PEEK), polyurethane, polyurea, polyarylether, polyarylsulphides, polycarbonates, polyphenylene oxide (PPO) and modified PPO.

Suitable accelerators are any of the urone compounds that have been commonly used. Specific examples of accelerators, which may be used alone or in combination, include N,N-dimethyl, N'-3,4-dichlorphenyl urea (Diuron), N'-3-chlorophenyl urea (Monuron), and preferably N,N-(4-methyl-m-phenylene bis[N',N'-dimethylurea] (e.g. Dyhard UR500 available from Degussa).

Suitable fillers include, by way of example, any of the following either alone or in combination: silicas, aluminas, titania, glass, calcium carbonate and calcium oxide.

Suitable conducting particles, by way of example, include any of the following either alone or in combination: silver, gold, copper, aluminum, nickel, conducting grades of carbon, buckminsterfullerene, carbon particles, carbon nanotubes and carbon nanofibres. Metal-coated fillers may also be used, for example nickel coated carbon particles and silver coated copper particles.

The uncured matrix resin may include, if desired, an additional non-epoxy thermosetting polymeric resin. Once cured, a thermoset resin is not suitable for melting and remolding. Suitable non-epoxy thermoset resin materials for the present invention include, but are not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins, epoxide polymers, or any combination thereof. The thermoset resin is preferably selected from epoxide resins, cyanate ester resins, bismaleimide, vinyl ester, benzoxazine and phenolic resins. If desired, the matrix may include further suitable resins containing phenolic groups, such as resorcinol based resins, and resins formed by cationic polymerization, such as DCPD—phenol copolymers. Still additional suitable resins are melamine-formaldehyde resins, and urea-formaldehyde resins.

The uncured resin matrix is made in accordance with standard prepreg matrix processing. In general, the various epoxy resins are mixed together at room temperature or above (depending upon resin viscosities) to form a resin mix to which the thermoplastic component is added. This mixture is then heated to an elevated temperature (typically around 120° C.-130° C.) for a sufficient time to substantially dissolve the thermoplastic(s). The mixture is then cooled down to around 80° C.-90° C. or below (depending upon the viscosity of the mixture) and the insoluble thermoplastic particles and other additives, if any, are then mixed into the resin. The resin is then further cooled to around 70° C.-80° C. or below, if necessary, and the curing agent is added to form the final matrix resin that is impregnated into the fiber reinforcement. In a preferred process, once the soluble thermoplastic has been dissolved, the mixture is cooled to around 80° C. and all of the remaining ingredients, including the curing agent are added.

The matrix resin is applied to the fibrous reinforcement in accordance with any of the known prepreg manufacturing techniques. The fibrous reinforcement may be fully or partially impregnated with the matrix resin. In an alternate embodiment, the matrix resin may be applied to the fiber fibrous reinforcement as a separate layer, which is proximal to, and in contact with, the fibrous reinforcement, but does not substantially impregnate the fibrous reinforcement. The prepreg is typically covered on both sides with a protective film and rolled up for storage and shipment at temperatures that are typically kept well below room temperature to avoid premature curing. Any of the other prepreg manufacturing processes and storage/shipping systems may be used if desired.

The fibrous reinforcement of the prepreg may be selected from hybrid or mixed fiber systems that comprise synthetic or natural fibers, or a combination thereof. The fibrous reinforcement may preferably be selected from any suitable material such as fiberglass, carbon or aramid (aromatic polyamide) fibers. The fibrous reinforcement is preferably carbon fibers.

The fibrous reinforcement may comprise cracked (i.e. stretch-broken) or selectively discontinuous fibers, or continuous fibers. The use of cracked or selectively discontinuous fibers may facilitate lay-up of the composite material prior to being fully cured, and improve its capability of being shaped. The fibrous reinforcement may be in a woven, non-crimped, non-woven, unidirectional, or multi-axial textile structure form, such as quasi-isotropic chopped prepreg. The woven form may be selected from a plain, satin, or twill weave style. The non-crimped and multi-axial forms may have a number of plies and fiber orientations. Such styles and forms are well known in the composite reinforcement field, and are commercially available from a number of companies, including Hexcel Reinforcements (Villeurbanne, France).

The prepreg may be in the form of continuous tapes, towpregs, webs, or chopped lengths (chopping and slitting operations may be carried out at any point after impregnation). The prepreg may be an adhesive or surfacing film and may additionally have embedded carriers in various forms both woven, knitted, and non-woven. The prepreg may be fully or only partially impregnated, for example, to facilitate air removal during curing.

An exemplary preferred uncured resin matrix includes from 27 to 38 weight percent triglycidyl-m-aminophenol (trifunctional epoxy resin); from 10 to 20 weight percent tetrafunctional para-glycidyl amine (tetrafunctional epoxy resin); from 10 to 20 weight percent polyethersulfone (thermoplastic component); from 5 to 15 weight percent polyamideimide (insoluble particulate component); from 1 to 5 weight percent polyamide particles (insoluble particulate component); from 5 to 9 weight percent polyurethane particles (insoluble particulate component); and from 13 to 23 weight percent 3,3'-DDS (curing agent).

A particularly preferred uncured resin matrix includes about 32 to 34 weight percent triglycidyl-m-aminophenol (trifunctional epoxy resin); about 14 to 16 weight percent tetrafunctional para-glycidyl amine (tetrafunctional epoxy resin); about 13 to 15 weight percent polyethersulfone (thermoplastic component); about 6 to 11 weight percent polyamideimide (insoluble particulate component); about 2 to 4 weight percent polyamide particles (insoluble particulate component); about 6 to 8 weight percent polyurethane particles (insoluble particulate component); and about 17 to 19 weight percent 3,3'-DDS (curing agent).

The prepreg may be molded using any of the standard techniques used to form composite parts. Typically, one or more layers of prepreg are place in a suitable mold and cured to form the final composite part. The prepreg of the invention may be fully or partially cured using any suitable temperature, pressure, and time conditions known in the art. Typically, the prepreg will be cured in an autoclave at temperatures of between 160° C. and 190° C. The uncured composite material may also be cured using a method selected from UV-visible radiation, microwave radiation, electron beam, gamma radiation, or other suitable thermal or non-thermal radiation.

Composite parts made from the improved prepreg of the present invention will find application in making articles such as numerous primary and secondary aerospace structures (wings, fuselages, bulkheads and the like), but will also be useful for other high performance structural applications in the automotive, rail, marine and energy industries where high tensile strength, compressive strength, interlaminar fracture toughness and resistance to impact damage are needed.

In order that the present invention may be more readily understood, reference will now be made to the following examples of the invention.

Example 1

A preferred exemplary resin formulation in accordance with the present invention is set forth in TABLE 1. A matrix resin was prepared by mixing the epoxy ingredients at room temperature with the polyethersulfone to form a resin blend that was heated to 130° C. for 60 minutes to completely dissolve the polyethersulfone. The mixture was cooled to 80° C. and the rest of the ingredients (polyamideimide particles, polyurethane particles, polyamide particles and curing agent) were added and mixed in thoroughly.

TABLE 1

| Amount (Wt %) | Ingredient |
|---|---|
| 33.04 | Trifunctional meta-glycidyl amine (MY0600) |
| 14.87 | Tetrafunctional para-glycidyl amine (MY721) |
| 13.99 | Polyethersulfone (Sumikaexcel 5003P) |
| 10.00 | Polyamideimide (Torlon 4000TF) |
| 7.00 | Polyurethane particles (SUNPU-170) |
| 3.00 | Polyamide particles (Orgasol 1002 D Nat 1) |
| 18.1 | Aromatic diamine curative (3,3'-DDS) |

Exemplary prepreg was prepared by impregnating one or more layers of unidirectional carbon fibers with the resin formulation of TABLE 1. The unidirectional carbon fibers were used to make a prepreg in which the matrix resin amounted to 35 weight percent of the total uncured prepreg weight and the fiber areal weight was 190 grams per square meter (gsm). A variety of prepreg lay ups were prepared using standard prepreg fabrication procedures. The prepregs were cured in an autoclave at 180° C. for about 2 hours. The cured prepregs were then subjected to standard tests to determine their open hole compressive strength, tolerance to damage and interlaminar fracture toughness as described below.

Open hole compression (OHC) was determined at room temperature using a 16-ply quasi-isotropic laminate. The laminate was cured for 2 hours at 180° C. in an autoclave and gave a nominal thickness of 3 mm (0.12 inch). Consolidation was verified by C-scan. The specimens were machined and tested in accordance with Boeing test method BSS 7260. Values are normalized to a nominal cured laminate thickness of 0.12 inch.

Compression after Impact (CAI) after a 200 in-lb impact was determined using a 24-ply quasi-isotropic laminate. The laminate was cured at 180° C. for 2 hours in the autoclave. The final laminate thickness was about 4.5 mm (0.18 inch). The consolidation was verified by c-scan. The specimens were machined, impacted and tested in accordance with Boeing test method BSS7260. Values are normalized to a nominal cured laminate thickness of 0.18 inches.

G1c and G2c are standard tests that provide a measure of the interlaminar fracture toughness of the cured laminate. G1c and G2c were determined as follows. A 20-ply unidirectional laminate was cured with a 3 inch fluoroethylene polymer (FEP) film inserted along one edge, at the mid-plane of the layup, perpendicular to the fiber direction to act as a crack starter. The laminate was cured for 2 hours at 180° C. in an autoclave and gave a nominal thickness of 3.8 mm (0.15 inch). Consolidation was verified by C-scan. Both G1c and G2c were machined from the same cured laminate. G1c was tested in accordance with Boeing test method BSS7273 and G2c was tested in accordance with BMS 8-276. Values for G1c and G2c were not normalized.

The cured prepreg had an OHC of 53 ksi, a CAI of 51 ksi, G1c of 2.1 in-lb/in$^2$ and a G2c of 14 in-lb/in$^2$.

Comparative Examples

Comparative prepreg C1, C2 and C3 were made and tested in the same manner as the above-described preferred exemplary prepreg. C1 was identical to Example 1, except that the amount of polyurethane particles was changed to 10 weight percent and the amount of polyamide particles was changed to 0 weight percent. C2 was also identical to Example 1, except that the amount of polyurethane particles was changed to 0 weight percent and the amount of polyamide particles was changed to 10 weight percent. C3 was also identical to Example 1, except that the amount of polyurethane particles was changed to 5 weight percent and the amount of polyamide particles was changed to 5 weight percent. The results of the tests are summarized in TABLE 2 where the relative amounts of polyurethane particles and polyamide particles are shown in parenthesis. The relative weights of elastic particles (polyurethane) and rigid particles (polyamideimide and polyamide) are: 7/3 for Example 1; 10/10 for C1; 0/20 for C2 and 5/15 for C3.

TABLE 2

|  | OHC | CAI | G1c | G2c |
|---|---|---|---|---|
| Example 1 (7/3) | 53 | 51 | 2.10 | 14 |
| Comparative 1 (10/0) | 50.5 | 50.7 | 1.81 | 4.7 |
| Comparative 2 (0/10) | 50.7 | 43.0 | 1.55 | 5.3 |
| Comparative 3 (5/5) | 48.7 | 48.4 | 1.67 | 11 |

As can be seen from TABLE 2, all four of the measured values reach a peak when the relative amounts of polyurethane particles and polyamide particles are 7 weight percent and 3 weight percent (7/3), respectively. This peak in all four test values was unexpected. For example, Comparative 1 (10/0) has a higher CAI and G1c than Comparative 2 (0/10), but has lower OHC and G2c values. Comparative 1 (10/0) has higher, OHC, CAI and G1c values than Comparative 3 (5/5), but has a much lower G2c value. Comparative 2 (0/10) has a higher OHC value than Comparative 3, but has lower CAI, G1c and G2c values. The Comparative examples demonstrate that OHC, CAI, G1c and G2c values vary randomly as the relative amounts of polyurethane and polyamide particles are varied between 10/0 and 0/10. It is unusual and unexpected that all four of the measured values peaked when the relative amounts of polyurethane and polyamide particles reached 7/3. The relatively high values for OHC, CAI, G1c and G2c make the composite materials in accordance with the present invention particularly well-suited for use in structural applications, such as aircraft primary structures.

As demonstrated in the examples and comparatives, an unexpected peak in all of the measured values is reached by Example 1 at a ratio of polyurethane particles to polyamide particles of about 2.3:1 (7/3). This corresponds to a weight ratio of elastic particles (7 weight percent polyurethane particles) to rigid particles (10 weight percent polyamideimide and 3 weight percent polyamide) of 1:1.9. The weight ratio of PAI to PA for the preferred exemplary embodiment (Example 1) is 3.3:1.

Relatively high OHC, CAI, G1c and G2c values are also expected when the weight ratio of elastic particles to rigid particles is between 1:1.3 and 1:2.1. Less preferred, but still acceptable for structural applications are weight ratios of elastic particles to rigid particles of between 1:1.3 and 1:2.5. Relatively high OHC, CAI, G1c and G2c values are also expected when the ratio of polyurethane particles to polyamide particles is between 2.0:1 and 2.5:1. Less preferred, but still acceptable for structural applications are weight ratios of polyurethane particles to polyamide particles of between 3.0:1 and 1.5:1.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A method for making a prepreg for use in structural applications, said method comprising the steps of:
    providing an uncured resin comprising:
        an epoxy resin component;
        a soluble thermoplastic component;
        an insoluble particulate component comprising a blend of particles comprising rigid particles and elastic particles wherein the weight ratio of elastic particles to rigid particles ranges from 1:1.3 to 1:2.5; and;
        a curing agent; and
    combining said uncured resin with a fibrous reinforcement to provide said prepreg.

2. A method according to claim 1 wherein said epoxy resin component comprises a trifunctional epoxy resin and a tetrafunctional epoxy resin.

3. A method according to claim 2 wherein said trifunctional epoxy resin is a trifunctional meta-glycidyl amine.

4. A method according to claim 1 wherein said soluble thermoplastic component comprises polyethersulfone.

5. A method according to claim 1 wherein said elastic particles are polyurethane particles.

6. A method according to claim 1 wherein said rigid particles are selected from the group consisting of polyamideimide particles and polyamide particles.

7. A method according to claim 1 wherein said elastic particles comprise polyurethane particles and said rigid particles comprise polyamideimide particles and polyamide particles.

8. A method according to claim 1 which includes an additional step of curing said uncured resin to form a cured composite part.

9. A method according to claim 8 wherein said cured composite part forms at least part of a primary structure of an aircraft.

10. A method according to claim 7 wherein the weight ratio of polyamideimide particles to polyamide particles ranges from 2:1 to 4:1.

11. A method according to claim 7 wherein the weight ratio of polyurethane particles to polyamide particles ranges from 3.0:1 to 1.5:1.

12. A method according to claim 1 wherein said uncured resin comprises conducting particles.

13. A method according to claim 12 wherein said conducting particles comprises carbon particles.

14. A method according to claim 2 wherein said trifunctional epoxy resin is present in an amount of from 27 to 38 weight percent of the total weight of said uncured resin and said tetrafunctional epoxy resin is present in an amount of from 10 to 20 weight percent of the total weight of said uncured resin.

15. A method according to claim 14 wherein said soluble thermoplastic component is present in an amount of from 10 to 20 weight percent of the total weight of said uncured resin.

16. A method according to claim 15 wherein said soluble thermoplastic component comprises polyethersulfone.

17. A method according to claim 16 wherein said rigid particles comprise polyamideimide particles and polyamide particles wherein said polyamideimide particles are present in an amount of from 5 to 15 weight percent of the total weight of said uncured resin and wherein said polyamide particles are present in an amount of from 1 to 5 weight percent of the total weight of said uncured resin.

18. A method according to claim 17 wherein said elastic particles comprise polyurethane particles that are present in an amount of from 5 to 9 weight percent of the total weight of said uncured resin.

19. A method according to claim 1 wherein said curing agent comprises 3,3'-diaminodiphenyl sulfone.

20. A method according to claim 18 wherein said curing agent comprises 3,3'-diaminodiphenyl sulfone.

* * * * *